United States Patent [19]

Ljung et al.

[11] Patent Number: 4,691,323

[45] Date of Patent: Sep. 1, 1987

[54] PATH LENGTH CONTROLLER FOR RING LASER GYROSCOPE

[75] Inventors: Bo H. G. Ljung, Wayne; Walter J. Krupick, Succasunna, both of N.J.

[73] Assignee: The Singer Company, Stamford, Conn.

[21] Appl. No.: 619,227

[22] Filed: Jun. 11, 1984

[51] Int. Cl.[4] .................. H01S 3/08; H01S 3/083; G01B 9/02

[52] U.S. Cl. .................. 372/107; 356/350; 372/94; 372/99

[58] Field of Search .................. 356/350; 372/94, 99, 372/107

[56] References Cited

U.S. PATENT DOCUMENTS

| | | | |
|---|---|---|---|
| 3,581,227 | 5/1971 | Podgorski | 372/94 |
| 4,113,387 | 9/1978 | Shutt | 356/350 |
| 4,348,113 | 9/1982 | Bonfils | 356/350 |
| 4,383,763 | 5/1983 | Hutchings et al. | 356/350 |

Primary Examiner—Stephen C. Buczinski
Attorney, Agent, or Firm—David L. Davis

[57] ABSTRACT

A ring laser gyro path length controller has a cup-like fixture which mounts a piezoelectric actuator and is bonded directly to the gyro block. A mirror assembly is concentrically located within the fixture and is independently mounted to the gyro block thereby enabling independent assembly and disassembly of the fixture and the assembly. Diaphragm sections of the assembly are coaxially positioned and connected to a diaphragm section of the fixture so that bidirectional displacement of the assembly may occur and the moment generated by the actuator results in an axial deflection force on the assembly. A strip of material having a high coefficient of expansion is mounted to the piezoelectric actuator to augment the deflection force as temperature increases thereby reducing the power demands of the actuator.

1 Claim, 7 Drawing Figures

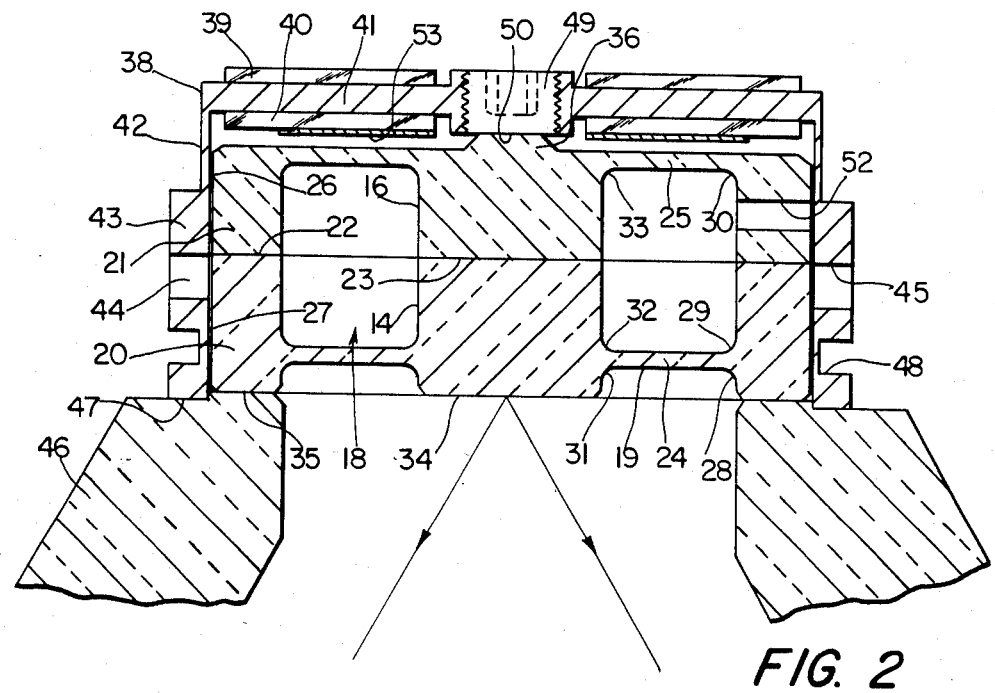
FIG. 2
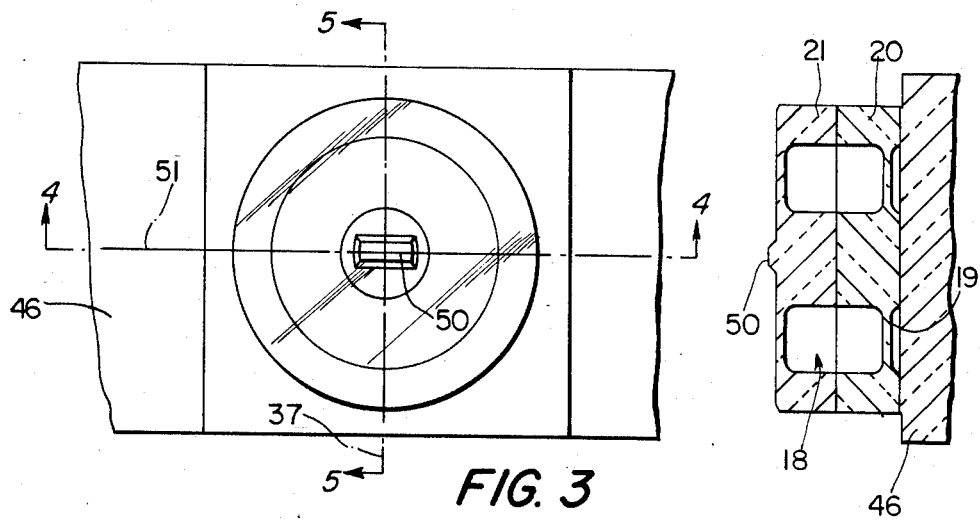
FIG. 3
FIG. 5
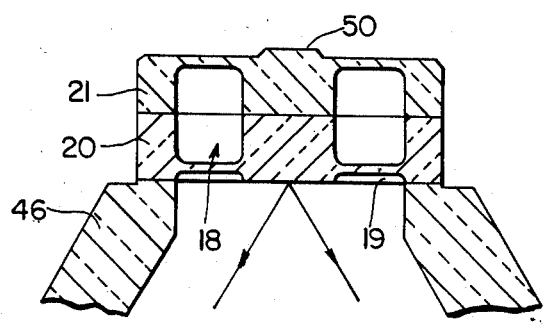
FIG. 4

PATH LENGTH CONTROLLER FOR RING LASER GYROSCOPE

FIELD OF THE INVENTION

The present invention relates to ring laser gyroscopes and more particularly to a novel mounting for a path length controller for such a gyroscope.

BRIEF DESCRIPTION OF THE PRIOR ART

As summarized in U.S. Pat. No. 4,160,184, a ring laser gyro, as its name implies, is a gyroscope which utilizes a laser beam directed to travel in a closed path, e.g., a ring, to detect rotation about the axis of the path around which the laser beam is directed. Typical ring laser gyroscopes are disclosed in U.S. Pat. Nos. 3,373,650 and 3,467,472. The ring laser gyroscope must be capable of operating over a wide range of temperatures. As a result, the material of which the gyroscope is made suffers thermal expansion and contraction as the temperature changes. The laser beam within the ring laser gyroscope is directed in its path by means of mirrors, typically in a triangular path between three mirrors. The temperature change resulting in expansion or contraction, causes a change in the path length. This change in path length, if not corrected, can result in a drift, i.e., an output indicating a rotation when there actually is none, and also results in scale factor changes. Thus, it is common practice to make one mirror with a flexible annulus and mount this mirror on a piezoelectric transducer which is controlled so as to maintain the path length constant even though temperature changes make the material expand or contract.

Present ring laser gyroscopes are quite sensitive to extremely small amounts of contamination on the mirrors. Such contamination may take the form of small particles freed from the walls of the ring laser gyroscope bores as a result of plasma erosion. Such contamination results in greater noise, e.g., random walk of a ring laser gyroscope. It is now common practice to remove and clean the mirrors periodically to remove such contamination. However, the present ring laser gyroscope designs require a cemented bond to be broken between a mirror assembly and a piezoelectric transducer mount which generally results in destruction of mirror optical alignment. Upon cleaning of the mirrors, the prior art ring laser gyroscopes must be carefully reassembled and realigned, which is a costly and time consuming proposition.

BRIEF DESCRIPTION OF THE PRESENT INVENTION

The present invention utilizes a piezoelectric transducer which meets stringent requirements for freedom from unwanted tilt and displacement of the mirror with changes in temperature. The transducer is also modular, allowing the assembly of the mirror portion and the transducer portion to be made independent of each other. By virtue of the present design, disassembly of the transducer portion can be made without destroying the parts and without changing the alignment of the mirror portion.

The angular stability of the present transducer can be increased substantially by the use of a diffusion-bonded mirror assembly in place of the conventional epoxied joint. Such increased stability translates to increased bias stability of the ring laser gyroscope.

The above-mentioned objects and advantages of the present invention will be more clearly understood when considered in conjunction with the accompanying drawings, in which:

BRIEF DESCRIPTION OF THE FIGURES

FIG. 2 is a partial sectional view of a path length controller which is an improvement of that shown in FIG. 1 and which represents a first embodiment of the present invention.

FIG. 3 is a top plan view of mirror components utilized in the present invention.

FIG. 4 is a sectional view taken along a plane passing through section line 4—4 of FIG. 3.

FIG. 5 is a sectional view taken along a plane passing through section line 5—5 of FIG. 3.

DETAILED DESCRIPTION OF THE INVENTION

Figure 1:
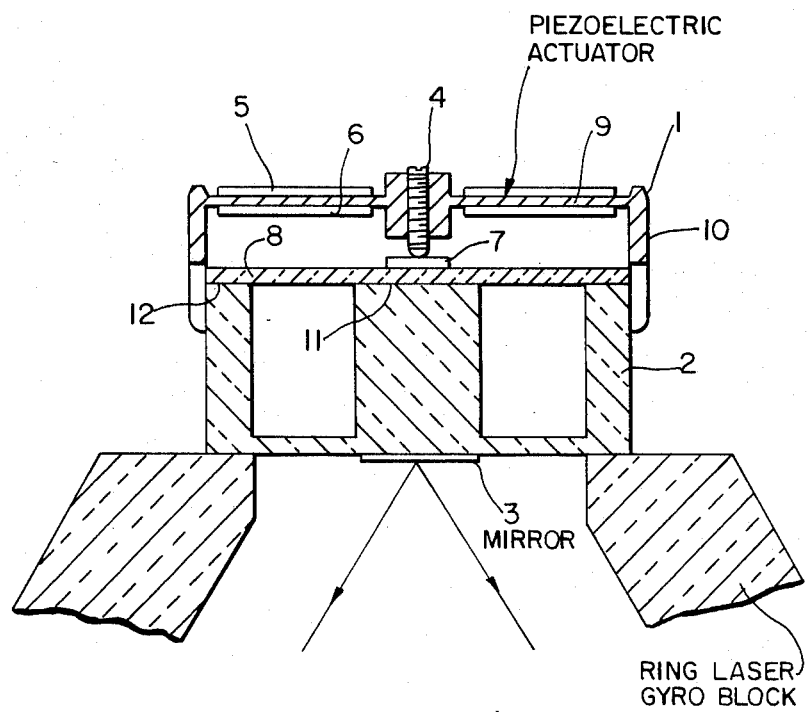
FIG. 1 is a partial sectional view of a ring laser gyroscope path length controller constituting prior art.

FIG. 1 illustrates a path length controller as detailed in U.S. Pat. No. 4,383,763. The prior art controller includes a mirror 3, which reflects laser beams through a triangular or ring path. The mirror 3 is mounted to a block 2 having its upper central edge permanently bonded to a diaphragm 8, along joint 11. Identical bonding between outer portions of the block and the diaphragm 8 occurs along annular joint 12. A cup shaped fixture, generally indicated by reference numeral 1, is fabricated from Invar and is cemented directly to block 2 at the illustrated joint therebetween. Permanent bonding of the fixture to the block makes the resulting assembly difficult to disassemble without affecting the alignment of mirror 3. The piezoelectric elements 5 and 6 are mounted on either side of fixture diaphragm 9. The diaphragm 9 is axially offset from diaphragm 8 so that bearing screw 4 may be adjusted to bear against bearing plate 7 which is attached to diaphragm 8. The screw is adjusted so that it may be firmly positioned against the bearing plate 7 for initial positioning of the mirror 3.

A problem of angular misalignment is created if the transducer shown in FIG. 1 transmits bearing force off center with respect to block 2. It is difficult to fabricate a screw 4 and fixture 1 so that the screw is centered.

The fixture 1 has a relatively thick rim 10 compared with diaphragm 9. As a result a large proportion of the moment generated by piezoelectric elements 5 and 6 will be required to bend the rim, and the force applied to block 2 and attached mirror 3 will be substantially decreased.

An additional problem of the prior art design shown in FIG. 1 relates to the limiting of motion of block 2 and attached mirror 3 because only a compressive force can be supplied to the block from the screw.

An additional problem of the prior art shown in FIG. 1 relates to the joints 11 and 12 between block 2 and diaphragm 8. These joints are highly stressed because the stress is concentrated at the edges. Cemented separation can occur even with relatively small axial movements which can result in undesirable mirror tilts.

The first embodiment of the present invention, as shown in FIG. 2, illustrates a novel path length controller utilizing a piezoelectric actuator. A controller includes a mirror assembly which comprises a circular mirror element 20 and a diaphragm element 21 which are diffusion-bonded at joints 22 and 23. Annular recesses are formed in diaphragm 21 and mirror element 20 so as to create the illustrated enlarged annular opening 18 separated from a second smaller annular groove 19 by diaphragm portion 24. Similarly, a thin portion of diaphragm element 21 creates a diaphragm section 25 which is axially aligned but spaced from diaphragm portion 24 in the mirror element 20. The diaphragm portion 24 and diaphragm section 25 are axially spaced to make the resulting assembly extremely stiff when encountering an angular force and yet relatively flexible to an axial force. Diaphragm portions are centered and the surfaces have low run out to the outward radial surfaces 26 and 27 of diaphragm element 21 and mirror element 20, respectively. The corners 28 and 31 existing in the annular groove 19, as well as corners 29, 30, 32, and 33 existing in annular opening 18, have controlled radii to minimize stress concentration. A highly polished mirror surface 34 and mirror element surface 35 extend some distance in the axial direction beyond the diaphragm portion 24 to allow the extended surfaces to be initially machined and later reworked without affecting the dimensions of the diaphragm portion. A small vent hole 52 is formed in diaphragm element 21.

The diaphragm element 21 has a small projection 36 along its upper illustrated surface which is centered with respect to diaphragm portion 24 and diaphragm section 25. The top of projection 36 is flat and parallel to the mirror surface 34.

In its simplest form, the contact surface 50 on top of projection 36 may be circular. However, in order to minimize the moments caused by an off-center piezoelectric actuator, the contact surface can be rectangular as illustrated in FIGS. 3, 4 and 5. Referring to FIG. 3, axis 51 is perpendicular to the gyro axis. This decreases the moment generated around axis 51 and increases the moments around axis 37 due to a non-symmetrical piezoelectric actuator. However, the gyro is only sensitive to angular tilt around axis 51. The mirror element 20 is contact bonded to the ring laser gyro block 46 along annular surface 35. The first embodiment of the present invention shown in FIG. 2 includes a cup-shaped fixture 38 which is preferably fabricated from a low expansion material such as Super Invar. The fixture mounts two symmetrical piezoelectric elements 39 and 40 cemented to diaphragm section 41, the piezoelectric elements being centered with respect to the axis of the cup-shaped fixture. The fixture includes an integral rim 42 which is substantially thinner than the diaphragm section 41. The lower enlarged fixture section 43 is substantially thicker than the rim 42. Several radial holes such as 44 and 45 are illustrated. These can be used for assembly and disassembly of the piezoelectric actuator from the block 46. The actuator is centered with respect to the radially outward radial surface 27 and is cemented to the ring laser gyro block 46 along annular joint 47. A groove 48 is cut in lower enlarged fixture section 43 to relieve the stress on the cemented joint 47. The actuator is bonded to the diaphragm element 41 by virtue of the connection between projection 36 and adjustment screw 49, along surface 50 which is covered by a film of cement. The screw 49 is centered with respect to the cup-shaped fixture 38 and surface 50 is flat and perpendicular with respect to the axis of fixture. Surface 50 is slightly larger in diameter than projection 36. The fit between the threads of screw 49 is slightly loose so that the screw surface adjusts itself parallel to the top of projection 36. The screw is set to have a slight preload while the cement film on surface 50 is being cured.

To compensate for the average change of path length of the ring laser gyro and path length control components, which typically increases with temperature, a thin sheet 53, which has a relatively high coefficient of expansion, is adhesively bonded to piezoelectric element 40. The higher thermal expansion of thin sheet 53 will create an inward force towards the mirror surface 34 thereby compensating for the increase in path length due to temperature expansion. By compensating the average change in path length mechanically, the force required from the piezoelectric elements is reduced and, as a result, the voltage applied to these elements may be reduced.

Figure 6:
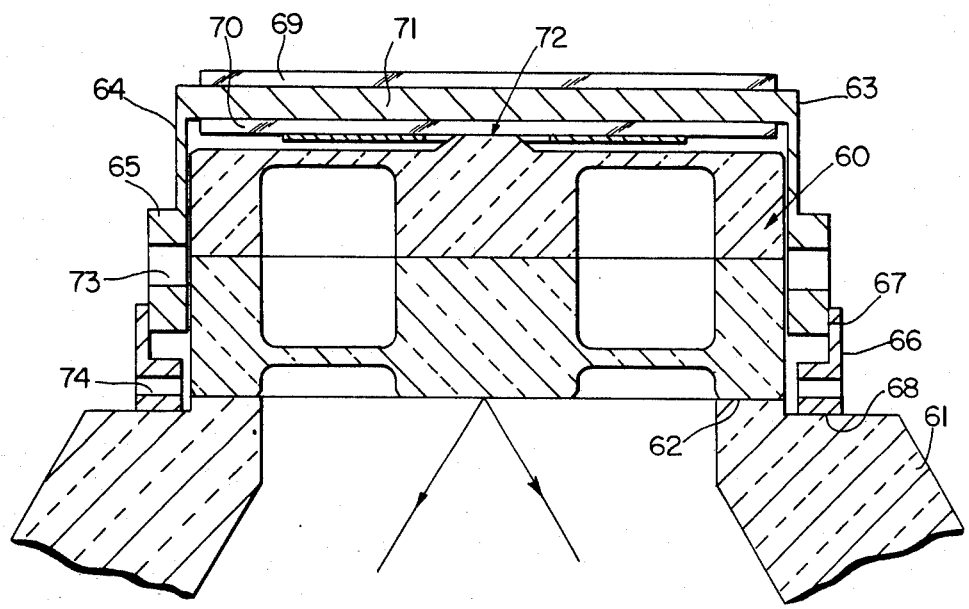
FIG. 6 is a sectional view of a path length controller constituting a second embodiment of the present invention.

An alternate embodiment of the present invention is illustrated in FIG. 6. In this embodiment the mirror assembly 60 includes mirror element 20 and diaphragm element 21 as in the case of the previous embodiment. The mirror assembly is contact bonded to the ring laser gyro block 61 along annular joint 62. The piezoelectric controller actuator fixture 63 has an integral thin rim 64 as compared with a thicker enlarged fixture section 65. The thicker enlarged fixture section 65 is cement bonded to adapter rim 66 along annular joint 67 which is in turn cement bonded to the ring laser gyro block 61 along annular joint 68. Adapter rim 66 and enlarged fixture section 65 have several radial holes such as 74 and 73, respectively, to facilitate assembly and disassembly of the various components. The piezoelectric elements 69 and 70 are cement bonded to diaphragm section 71 while element 70 is cement bonded to the projection 72 at the interface therebetween.

In the assembly sequence for this configuration, the mirror assembly 60 is moved to an optimum position and in coaxial relationship with the fixture 63. When this is achieved, adapter rim 66 is cemented in place. Then, diaphragm section 71 is cemented to the projection 72. Finally, the enlarged fixture section 65 is cemented to adapter rim 66.

Figure 7:
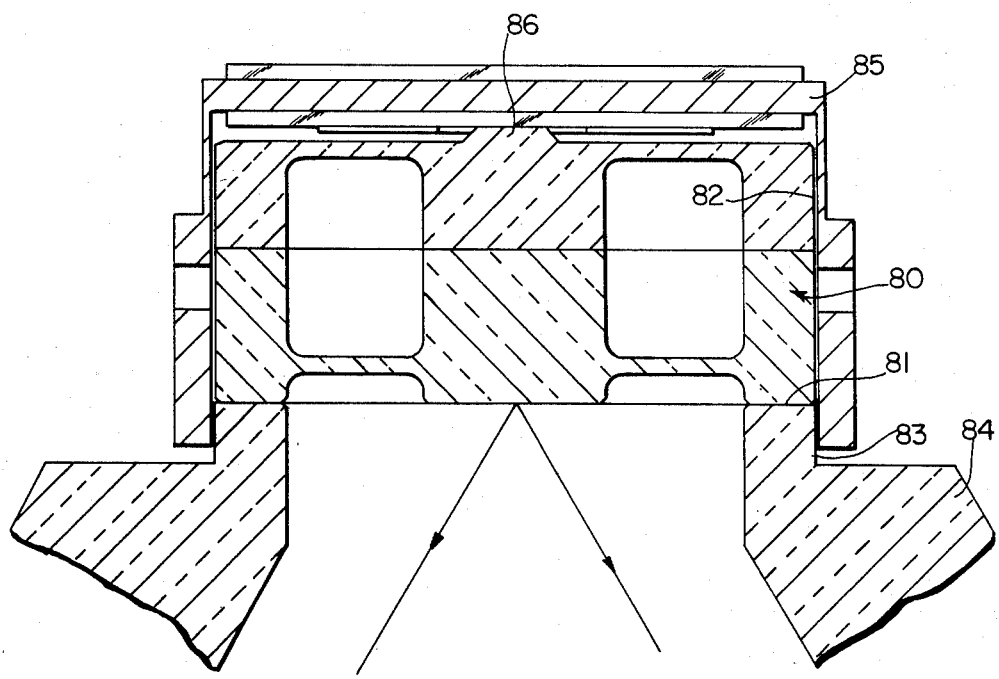
FIG. 7 is a sectional view of a path length controller constituting a third embodiment of the present invention.

FIG. 7 illustrates a third embodiment of the present invention. In this embodiment the mirror assembly 80, including circular mirror element 20 and diaphragm element 21, is contact bonded at 81 to the ring laser gyro block 84 so that the radially outward surface 82 of the mirror assembly is concentric with the circular shoulder 83 machined in the block 84. The diaphragm section of fixture 85 is similar to that previously discussed in connection with FIG. 6. Thus, it is cement bonded to the mirror assembly at the interface with projection 86 under a light preload.

Referring back to FIG. 2, due to the diffusion bonding between circular mirror element 20 and diaphragm element 21 of a mirror assembly, the resultant structure is quite stiff to angular tilt and much stiffer axially. This makes it easier to polish the mirror surface 34 and mirror element surface 35 and to keep them parallel. The diaphragm portion 24 is recessed from mirror surface 34 thereby allowing the surfaces to be machined and polished and also refinished as required without disturbing diaphragm portion 24.

Diaphragm portion 24 and diaphragm section 25 are joined to the central sections of circular mirror element 20 and diaphragm element 21 to reduce stress concentration at these points. The diffusion bonds are made in the central sections which are relatively thick thereby eliminating a stress concentration at these points.

The path length control actuator is primarily attached to the ring laser gyro block itself which makes it easier to disassemble it from the gyro without affecting the mirror assembly. The path length actuator is attached to the mirror assembly at a small projection, such as 36 (FIG. 2), which can be made concentric to the diaphragm portion 24 and which can be shaped, such as shown in FIG. 3, to minimize tilt moments along the sensitive axis. Due to the way the path length actuator is mounted in the embodiments of the invention, positive and negative displacement force may be exerted on circular mirror element 20 and diaphragm element 21.

The path length control fixture has a thin rim which reduces the moments required to bend the rim and, as a result, substantially all of the moment generated by the piezoelectric elements is used to apply an axial force.

A mechanical compensation method is provided which reduces the voltage required for the piezoelectric elements thus resulting in a lower cost power supply. It also reduces the hysteresis resulting from highly stressed piezoelectric elements.

It should be understood that the invention is not limited to the exact details of construction shown and described herein for obvious modifications will occur to persons skilled in the art.

We claim:

1. A ring laser gyro path length controller comprising:

an actuator fixture having a mounting surface connected to a gyro block;

a mirror assembly having a projection formed thereon, the assembly located within the fixture and independently connected to the block for permitting independent assembly and disassembly of the assembly from the fixture;

a mirror means formed in the assembly for reflecting laser beams along predefined paths in the block;

actuator means mounted to the fixture for selectively deflecting a portion of the fixture; wherein displacement of the deflecting fixture portion causes translated deflection of the mirror means, and wherein the mirror assembly comprises:

a first disc having first and second transverse surfaces, the first surface being substantially planar and the second surface having an annular recess formed therein so as to define the mirror means at the center of the surface, a remaining portion of the first surface being coplanar with the mirror means and forming a connection joint for connection with the block; and a second disc having first and second transverse surfaces, the first surface being substantially planar and attached to the first surface of the first disc to form a unitary structure, and wherein the first and second discs have annular recesses formed in their first surfaces, the recesses being complementary thereby forming an enclosed annular space within the assembly which radially bounds a central hub of the assembly and defines transverse diaphragm sections in spaced coaxial relation for permitting deflection of the mirror means.

* * * * *